United States Patent [19]

Myers, Jr.

[11] 4,308,766

[45] Jan. 5, 1982

[54] LIQUID TIRE SEALANT INJECTION TOOL

[76] Inventor: James E. Myers, Jr., 11117 Thelma Ave., Sun Valley, Calif. 91352

[21] Appl. No.: 134,998

[22] Filed: Mar. 31, 1980

[51] Int. Cl.³ .............................................. B60C 25/16
[52] U.S. Cl. .................................................... 81/15.6
[58] Field of Search ................... 7/100; 29/213, 221.5; 81/15.2, 15.5, 15.6

[56] References Cited

U.S. PATENT DOCUMENTS

| | | | |
|---|---|---|---|
| 1,322,507 | 11/1919 | Anthony | 81/15.6 |
| 3,561,090 | 2/1971 | Fritch | 29/213 |
| 3,840,967 | 10/1974 | Olson | 29/213 |

FOREIGN PATENT DOCUMENTS

| | | | |
|---|---|---|---|
| 600601 | 6/1960 | Canada | 81/15.6 |
| 671659 | 12/1929 | France | 81/15.6 |

*Primary Examiner*—James G. Smith

[57] ABSTRACT

This invention relates to a tool well adapted for use in the injecting of liquid tire sealants and balancing fluids into a pressurized pneumatic tire, and including the combination of both a tire valve core remover and a fluid injector for facilitating the complete operation.

6 Claims, 7 Drawing Figures

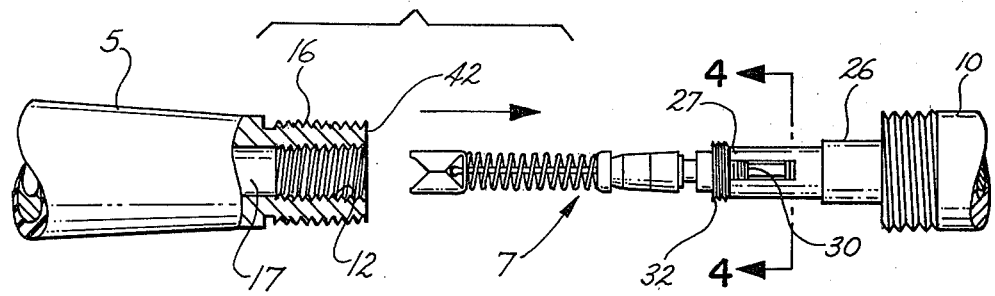
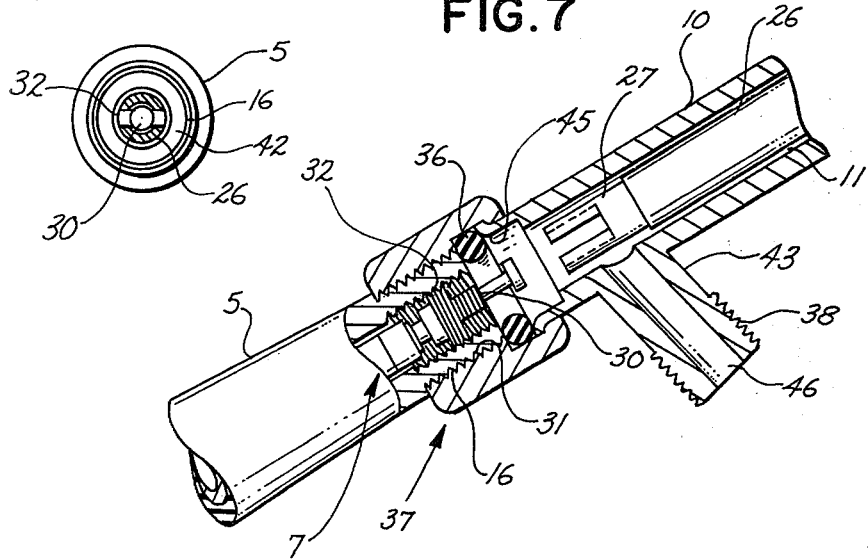
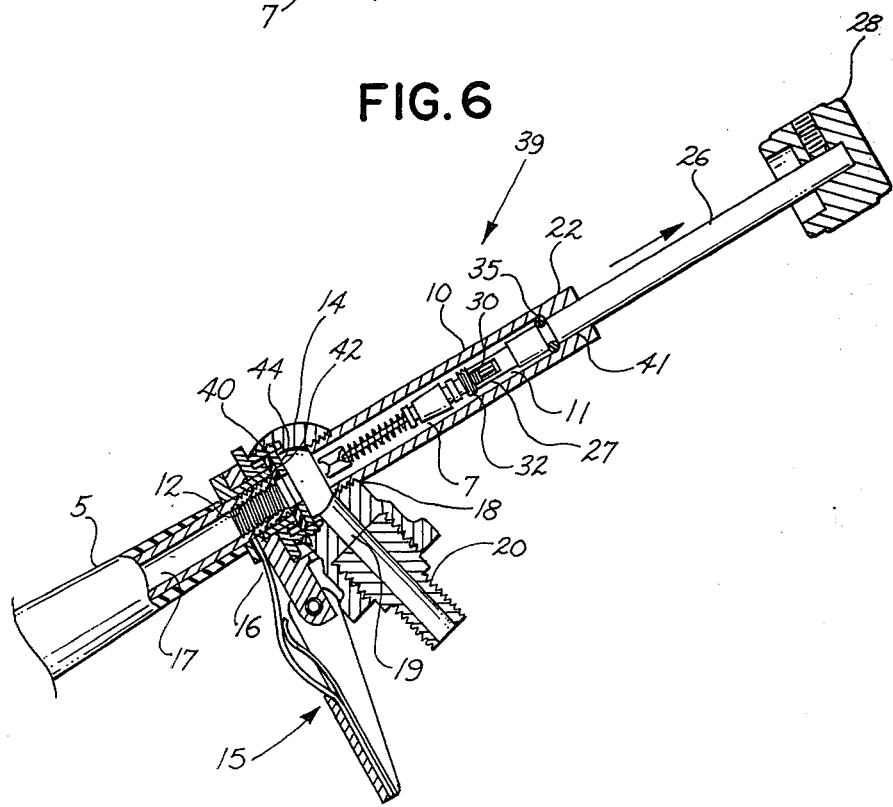

LIQUID TIRE SEALANT INJECTION TOOL

BACKGROUND OF THE INVENTION

The field of the invention is that of apparatuses and/or methods for sealing pneumatic tires by injecting a sealing liquid thereinto.

Many tire sealants and balancing fluids used to seal leaks and punctures from within a tube or tubeless tire are readily available in the marketplace that require the complete removal of the valve core from the valve stem. In most cases, part or all of the air pressure contained within the tire either escapes or is purposely released into the atmosphere during the installation of said sealant or balancing fluid. In other words, the pneumatic tire is unavoidably either partially or completely deflated during the installation process.

If the tire is on a vehicle, this means that the weight of the vehicle on its wheel rim will crunch down on a portion of the collapsed tire running the risk of the vehicle wheel rim cutting or otherwise damaging the tire, its tube, or both! In order to reduce the possibility of damage, it is often customary to either remove the wheel completely from the vehicle or jack up the vehicle in order to remove weight from the wheel during this installation process.

After sealant installation, it is then necessary to replace the valve core and reinflate the pneumatic tire to the tire manufacturer's prescribed or safe operating pressure. This means also that the usual installation processes require an air source to be available that is capable of repressurizing the tire once the liquid is inserted into the tire and the valve core replaced.

SUMMARY OF THE INVENTION

Generally speaking, the present invention comprises a tool, including both a tire valve core remover (and subsequent replacer) and a fluid injector for injecting a liquid tire sealant into a pneumatic tire for the purposes and objects outlined immediately hereinafter both explicitly and implicitly.

The purpose of the present invention is to provide a tool and method whereby the valve core is completely removed from the valve stem and out of the way of the flow of the sealant while it is being inserted while at the same time preventing the loss of tire air pressure. The liquid being inserted is then supplied under sufficient pressure so as to overcome the air pressure in the tire, thus forcing the sealant to flow into the tire or tube air chamber.

After the necessary amount of liquid material has been forced into the tire tube or chamber, the tool is then used to replace the valve core, preventing any significant loss of air after its detachment.

This tool and procedure therefore:

Make it unnecessary to have an air source available when inserting liquid sealants and balancers into a pneumatic tire.

Make it unnecessary to remove wheels from vehicles for the installation of tire sealants and balancers.

Make it unnecessary to jack up the vehicle and remove vehicle weight from wheels because tires are not deflated.

Make it quicker, easier and cleaner to insert tire sealants and balancers.

Other objects, advantages and meritorious features of this invention will more fully appear from the following specification, claims and accompanying drawings.

BRIEF DESCRIPTION OF THE DRAWINGS

FIG. 4, is a somewhat enlarged cross-sectional view taken along the plane and in the direction of the arrows 4—4 of FIG. 5, and with the valve stem behind the plane of the section removed for drawing simplification reasons. This view most clearly shows the bifurcated end of the operating shaft engaging the spatulate inner end of the tire valve core.

FIG. 5, is a fragmentary, laterally exploded view more clearly showing the parts which are temporarily, coupled together and more during a tire valve core removing operation, as shown in initial position in FIG. 3, and in final position in FIG. 6.

FIG. 6, is a fragmentary, partially broken-away and partially sectional view of aspect similar to FIG. 3, but shows the apparatus after completion of a tire valve core removing operation and at the beginning of a liquid tire sealant injection operation.

FIG. 7, is a fragmentary, partially broken-away and partially sectional view generally similar to FIG. 3, but illustrates one exemplary slight modification in a pre-engagement position with respect to a tire valve core inner end.

Referring now to FIG 1, I schematically show a common method of transferring liquids, such as tire sealants into a pneumatic tire. The liquid tire sealant 1 is supplied in a container 2 such as a drum, pail or source to which is attached a pressurizing means which is indicated as a pump 3 used to transfer the sealant from its container 2 through a hose 4 which is fastened by its connector 13 to the valve stem 5 of the tire 6 that is to receive the liquid tire sealant 1. The valve core 7 must be removed completely from the tire valve 5 prior to the fastening of the hose connector 13 since the viscosity of the sealant 1 and the particles and fibers that it may contain would clog or block the valve 5 were the valve core 7 merely depressed to a normal open position, thus preventing the sealant 1 from being transferred from the container 2 through the valve 5 and into the tire air chamber 8 of the tire as desired. The "tire air chamber" 8 where decribed herein consists of the entire inside surface of the tube in the case of a tubed tire, or all of the inside surfaces of the tire and wheel, if a tubeless tire.

Figure 1:
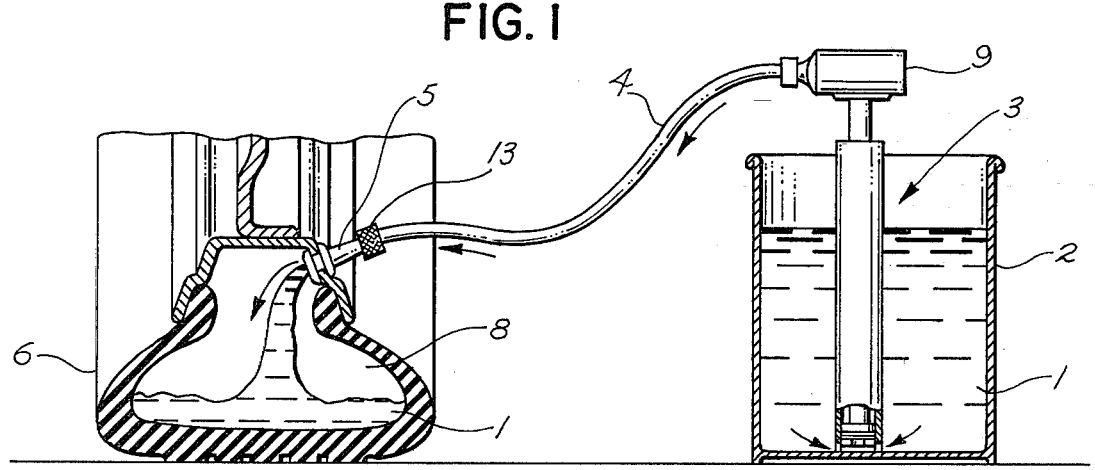
FIG. 1, is a somewhat simplified, diagrammatic view, partly in elevation and partly in section, illustrating prior art apparatus and practice in the field of tire sealant injection, and the disadvantages thereof.

The pump handle 9 is pressed downward, which pressurizes the sealant 1 above the pressure that is within the tire air chamber 8. This pressurization causes the sealant 1 to move from its container 2, through the hose 4, through the valve 5, which has its core 7 removed and to which the hose connector 13 is fastened and then into the tire air chamber 8.

After the sealant 1 transfer, the pump hose connector 13 is removed from the valve stem 5, the valve core 7 is replaced and the tire re-pressurized for use. As the tire 6 rotates in normal usage, the sealant 1 inside the tire air chamber 8 is distributed somewhat evenly throughout the entire inside of the tire air chamber 8 area where it is intended to coat and seal various porosity leaks or punctures that exist or that might occur in the future, or to assist in the balancing of the tire 6, or both.

Figure 2:
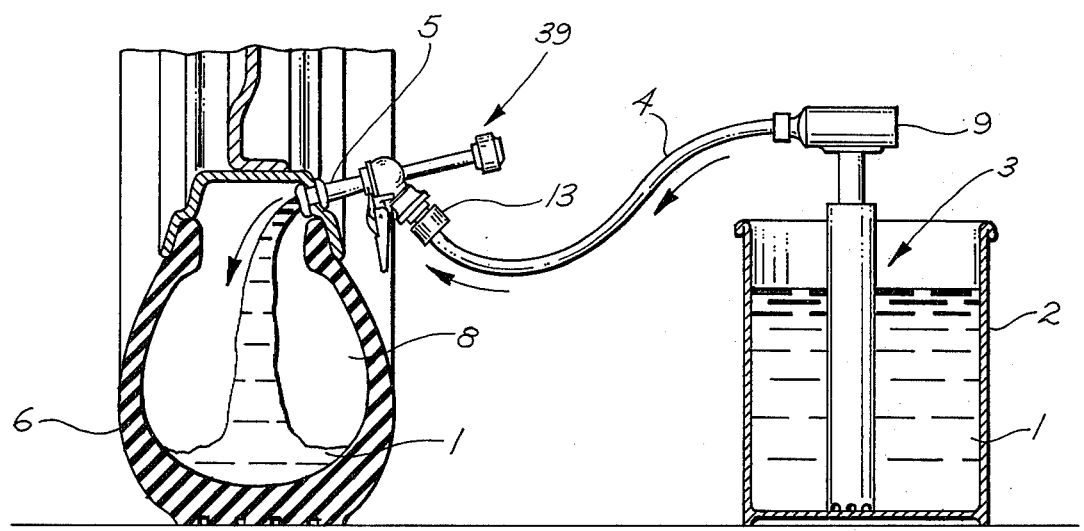
FIG. 2, is a view similar in many respects to FIG. 1, but shows one exemplary embodiment of the present invention, which overcomes the prior art disadvantages of FIG. 1.

FIG. 2 illustrates how the tool 39, object of the present application, is utilized in such a system as above described. The tool 39 is first connected to the valve 5 and the pump hose connector 13 is fastened to the threads 20 of the valve core remover and replacement tool 39 in a manner such as illustrated wherein a completely closed and airtight system capable of retaining all internal pressures existing between the pump 9 and the tire air chamber 8. When connected in this manner, air pressure cannot escape from the tire air chamber 8 into the atmosphere.

The tool 39 is next used to unscrew the valve core 7, move it completely out of the intended flow path of the sealant 1 into a temporary storage chamber 11, thus allowing the sealant 1 to flow from the container 2 through the pump 3, through the hose 4, through a portion of the tool 39, through the valve 5 and then into the tire air chamber 8. After the sealant 1 has been applied to the tire 6, the tool 39 moves the valve core 7 from its storage chamber 11, back into the valve 5 where it is again screwed into place. During this valve core return procedure, an "O" ring 35 pushes all of the sealant 1 out of the tool chamber 11, keeping chamber 11 clean.

The tool 39 is then removed from the tire valve 5 without any significant loss of air from within the tire air chamber 8.

Referring to FIGS. 3 to 6, where I show the structure of the embodiment of the tool 39 its operation and purposes can easily be understood. The tool body 10 has a cylindrical bore through a major portion of its length forming a chamber 11 slightly larger than the core of a Schrader-type valve 7. At the forward end of the chamber 11 is a Schrader ball-foot air chuck 14 with an air chuck quick-disconnect clip 15, which is designed purposely to attach to and detach from the outside threads 16 of a Schrader valve stem 5, holding the front or nipple end 42 of the Schrader valve stem 5 firmly against a rubber-type washer 40 forming a leakproof juncture.

A Schrader ball-foot air chuck 14 has been utilized and so modified that its internal mechanism which normally depresses the valve core 7 has been removed and an open threaded port 18 added that is in direct alignment with the valve stem port 17 and to which the body 10 of the tool 39 is permanently attached.

The port 19 of the Schrader ball-foot air chuck 14 through which air normally travels from a pressurized source in conventional use is provided with standard valve threads 20 to allow the pump hose connector 13 to be fastened.

The aft end of the tool body 10, generally indicated at 22 has a smaller inside bore 41 to snugly allow unrestricted rotation and movement of the grappling stem 26, while at the same time acting as an air vent thereby creating a vented chamber 11.

Figure 3:
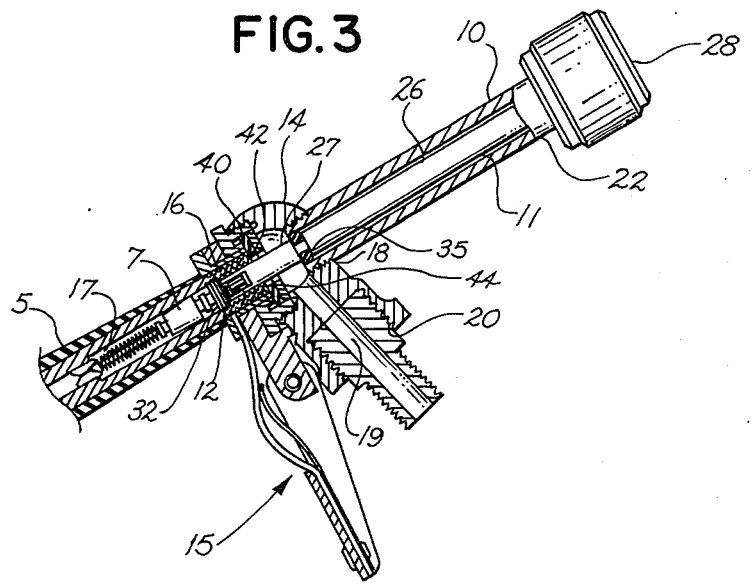
FIG. 3, is a somewhat enlarged, fragmentary and partially sectional view of only the tool portion of FIG. 2, and with certain other parts of FIG. 2, removed or broken-away, primarily for reasons for drawing simplification and clarification. This view shows the tool in a pre-removal relationship with respect to the tire valve core.

The grappling means of FIG. 3 is shown extended inwardly to engage the Schrader valve core 7. The grappling means of this embodiment includes a head 27 integral with the stem 26, a centering and wiping "O" ring 35 and a handle 28 retained on the aft end of the stem 26 by a setscrew 29. The construction of the grappling head 27 is best shown in FIG. 4 and FIG. 5. The grappling end of the stem 26 is bifurcated to present a set of tongs 27. The tongs 27 firmly grip the rectangular portion 30 of the Schrader valve core 7.

The Schrader type valve 5 shown is conventional. The valve core 7 is externally threaded 32 to be threadedly received within the valve body chamber 17. The grappling means 27 is rotatably and axially shiftable within the chamber 11 in response to manual manipulation of the of the handle 28. During the liquid transfer operation, the valve core 7 is removed from the valve chamber 17 of the valve 5 to allow unrestricted communication between the tire air chamber 8 and the liquid in the pressure line 4 driven by the pump 3 shown in FIG. 2.

To install and operate the tool 39, the grappling means 27 of the tool 39 is fully withdrawn to the position shown in FIG. 6. The pump hose 4 is connected to the threads 20 of the tool 39 by the connector 13. The tool 39 is then connected to the tire valve 5 by the Schrader ball-foot air chuck 14 with the clip portion 15 of the tool 39. A washer 44 of metal or other firm material with an inside diameter slightly smaller than the outside diameter of the valve stem 5 is positioned inwardly of the rubber washer 40 to prevent the possibility of a worn washer 40 or excessive connecting pressure by the operator causing or enabling the valve stem 16 to be forced beyond its intended positioning, causing damage to the tool 39 or blocking the sealant entrance port 19. The tool 39 is now in its position to function.

After the tool 39 is attached to the tire valve 5, the grappling means 27 is inserted by manual operation of the handle 28, to engage and grip the Schrader core 7. This is accomplished by slowly rotating the handle 28 and exerting slight inward pressure until the grappling means 27 seats on the rectangular extending portion 30 of the core.

At this position, the handle 28 is pressed firmly inwardly against the core 7, spreading and engaging the grappling means 27 tightly to the rectangular extending portion 30 of the core 7. The core 7 of the Schrader valve 5 may now be unthreaded and removed from the valve chamber 17 by rotating the handle 28 of the stem 26 and its grappling means 27 counterclockwise.

Rotation is continued until further rotation no longer results in a further unthreading of the handle 28 away from the tool body 10, indicating that the valve core 7 is free from the threads of the valve stem body chamber 17. The stem 26 may now be full retracted to the position shown in FIG. 6, where the "O" ring 35 abuts the narrow end 22 of the enlarged chamber 11, positioning the Schrader valve core 7 out of the flow path of the sealant 1 during the application so that the valve core 7 cannot interfere with the movement of the sealant 1 in the container 2 and the tire air chamber 8. The system is now ready for the transfer of sealant 1 from its container 2 into the tire air chamber 8.

When the sealant 1 is forced from its container 2 under higher pressure than exists within the tire air chamber 8 the sealant 1 flows freely into the tire chamber 8 until the desired amount of sealant 1 has been transferred into the tire air chamber 8. After inserting the tire sealant 1, the Schrader valve core 7 is then rethreaded into the valve chamber 17 by reversing the steps described above.

The grappling stem 26 is rotated and moved inwardly until the threads 32 of the valve core 7 engage the threads 12 of the valve stem chamber 17 of the valve stem 5. The valve core 7 may then be rethreaded into the body chamber 17 by clockwise rotation of the handle 28 until a firm reseating is achieved. The "O" ring 35 maintains the handle 28 ideally centered within the cylindrical tool chamber 11 and also maintains the core in appropriate alignment for re-engagement. The Schrader type ball-foot air chuck clip 15 is operated to unfasten the tool 39 from the valve 5.

It should be noted that the retaining "O" ring 35 performs distinct functions not necessarily limited to the following: Serves as a "stop" determining the maximum aft position point to which the grappling stem 26 may be withdrawn from the tool 39 when the "O" ring 35 reaches the narrowed end 22 of the chamber bore 11. Keeps the grappling stem 26 ideally centered in chamber 11 of the tool 39 throughout put its operational movement. Restricts the flow of liquid sealant and air always to a location inwardly of itself at any position of movement within the tool chamber 11 during operation. When the grappling stem 26 is extended forward to engage the threads of the valve core 32, with the threads in the valve stem 5 chamber 17, simultaneously, all of the sealant 1 and air is forced out of the body chamber 11, keeping the chamber 11 free from any liquid residue which might remain resulting in buildup and the clogging of the tool 39 during continued use. Prevents the leakage of air from the tire 6 or sealant 1 from escaping from the container 2, pump 3 and hose 4 system during the application process. When removing the tool 39 after the valve core 7 has been replaced, there may be sealant under pressure in the tool 39. The grappling stem 26 is withdrawn to its maximum aft position as shown in FIG. 6, somewhat lowering this pressure. After removal of the tool 39, the grappling stem 26 is pushed to the forward position shown in FIG. 3 again causing the "O" ring 35 to cleanse the chamber 11 of all residual sealant 1.

FIG. 7 shows an alternate method of coupling the tool 39 to the valve stem 5 without the Schrader type quick disconnect feature. This alternate method consists of flaring 45 the forward end of the tool body 10 to which a threaded ferrule 37 has been connected. An "O" ring 36 affixed between the flare 45 and the ferrule 37 prevents leakage when the ferrule is secured to valve stem 5. The ferrule 37 has female threads 31 to mate with the external threads 16 of the valve stem 5.

An angular positioned port shaft 43 is affixed to the tool body 10 close to the threaded ferrule with a port 46 extending into the tool chamber 11 and its threaded portion 38 being suitable for pump hose connecter 13 to attach, this being the standard Schrader type valve thread. After manual attachment to the tire valve 5, operation is identical as previously described.

What is claimed is:

1. A liquid tire sealant injection and/or tire balancing tool primarily used with pneumatic tube or tubeless tires having a threaded valve stem port provided with a removable threaded Schrader type valve core, comprising: a body member having a vented elongated chamber having an opening at one end for sealed communication with said threaded valve stem port and having a vented chamber wall opposite said opening, said body member having a laterally extending port for communication with an injection line, and an operating shaft extending through and guided by said vented chamber wall opposite said opening, said operating shaft having a Schrader type valve core grappling means including a bifurcated end located within said chamber at its inner end, a movable chamber sealing means taking the form of an "O" ring to center and support said operating shaft, and a control means located outside of said chamber, said grappling means being rotatably and axially shiftable within said chamber in response to said control means and having said bifurcated end thereof received over said Schrader type valve core to frictionally retain said core to effect unthreading of said valve core on rotation, and withdrawal of said valve core in response to axial motion of said control means to a position within said chamber between said laterally extending port and said vented chamber wall opposite said opening where it does not restrict the flow passage between said ports during the injection of liquid tire sealant and/or balancing fluid, said grappling means being also shiftable within said chamber in response to said control means to rethread and tighten said valve core within said threaded port after an injection operation has been completed.

2. Apparatus as defined in claim 1, wherein said chamber is cylindrical throughout its length and has a diameter slightly larger than said Schrader type valve core so that said grappling means can be operated to re-engage said valve core should said valve core and said grappling means become separated within said vented chamber.

3. Apparatus as defined in claim 1, wherein said sealing means taking the form of an "O" ring is affixed to the operating shaft located aft of, but near to the grappling means, said sealing means being snugly expandable to engage the outer diameter of the operating shaft and to engage the inside diameter of the said vented elongated chamber and functioning; (a) as a positioning means locating the said valve core ideally within said chamber at a position where it does not restrict the flow passage between said ports during fluid transfer when said "O" ring is abutting the chamber wall opposite said opening, (b) as a supporting means to maintain the said operating shaft ideally centered in said body member at all times and throughout its operational movement, (c) as said sealing means to contain all sealant or air in a location forward of itself regardless of the positioning of the operating shaft within the said vented elongated chamber (d) as a cleansing means or wiping means to evacuate all fluids or foreign substances from the said vented elongated chamber when the grappling means is shiftably located to rethread and tighten the valve core within said threaded port, (e) as a means for maintaining the vented elongated chamber air tight inward of itself regardless of the position of the operating shaft within the vented elongated chamber, and (f) as a decompressing means once the valve core is rethreaded and tightened into the valve stem port and the operating shaft is shifted to its maximum-aft position prior to disconnecting the tool from the valve stem port.

4. Apparatus as defined in claim 1, wherein said sealed communication between said threaded valve stem port and said body member is effected by a flared tube end provided at the forward portion of the vented elongated chamber, said flared tube end being provided with and being detachably secured to and communication with said threaded valve stem port by way of a screw-type thimble nut threadably engaged therewith and holding said flared tube end of said chamber in communication with said threaded valve stem port.

5. Apparatus as defined in claim 1, wherein said sealed communication between said threaded valve stem port and said body member is effected by the inclusion of a Schrader-type ball-foot air chuck equipped with a quick-disconnect air chuck clip, engaged with said chamber and sealably holding said chamber opening in communication with said threaded valve stem port.

6. Apparatus as defined in claim 5, wherein the normal and usual rubber type washer used in said air chuck for forced contact with the end of said valve stem port for effecting an air-tight and fluid-tight juncture is reinforced on its inner side with a blocking means consisting of a rigid piece of material having a central opening of a diameter smaller than the outside diameter of the valve stem port to which communication is made, so as to prevent wearing of the usual rubber type washer or excessive physical attachment pressure from possibly forcing the valve stem port into the tool beyond its intended communication position in communication with said rubber type washer.

* * * * *